US007810386B2

(12) United States Patent
Kraemer et al.

(10) Patent No.: US 7,810,386 B2
(45) Date of Patent: Oct. 12, 2010

(54) METHOD FOR A PLAUSIBILITY CHECK OF THE OUTPUT SIGNAL OF A RAIL PRESSURE SENSOR

(75) Inventors: Michael Kraemer, Stuttgart (DE); Stefan Denys, Zemmer-Rodt (DE)

(73) Assignee: Robert Bosch GmbH, Stuttgart (DE)

( * ) Notice: Subject to any disclaimer, the term of this patent is extended or adjusted under 35 U.S.C. 154(b) by 279 days.

(21) Appl. No.: 12/215,468

(22) Filed: Jun. 27, 2008

(65) Prior Publication Data

US 2009/0007647 A1 Jan. 8, 2009

(30) Foreign Application Priority Data

Jul. 2, 2007 (DE) ...................... 10 2007 030 713

(51) Int. Cl.
*G01M 15/09* (2006.01)

(52) U.S. Cl. ................................ 73/114.51; 71/114.43

(58) Field of Classification Search .............. 73/114.38, 73/114.43, 114.45, 114.48, 114.51
See application file for complete search history.

(56) References Cited

U.S. PATENT DOCUMENTS

| | | | | |
|---|---|---|---|---|
| 6,901,791 | B1 * | 6/2005 | Frenz et al. | 73/114.43 |
| 7,370,519 | B2 * | 5/2008 | Delp et al. | 73/114.45 |
| 2006/0130569 | A1 * | 6/2006 | Walther et al. | 73/119 A |
| 2006/0144131 | A1 * | 7/2006 | Schulz et al. | 73/118.1 |
| 2006/0150723 | A1 * | 7/2006 | Delp et al. | 73/119 A |
| 2009/0178474 | A1 * | 7/2009 | Bailey | 73/114.38 |
| 2009/0205413 | A1 * | 8/2009 | Yamauchi et al. | 73/114.41 |

* cited by examiner

*Primary Examiner*—Eric S McCall
(74) *Attorney, Agent, or Firm*—Kenyon & Kenyon LLP

(57) ABSTRACT

A method for checking the output signal of a rail pressure sensor of a direct-injecting internal combustion engine having a common rail system for plausibility, including the following steps:

the output signal of the rail pressure sensor is detected over a predefinable period of time and recorded;

the output signal is transformed into the frequency space;

characteristic features are extracted from the transformed signal;

a rail pressure value is calculated on the basis of the features and additional, predefined influencing variables;

an average rail pressure value is simultaneously ascertained from the output signal of the rail pressure sensor;

the average rail pressure value is compared with the calculated rail pressure value;

in the event that the calculated rail pressure value deviates from the average rail pressure value by a predefined limiting value, an error signal is output and/or stored in an error memory.

8 Claims, 3 Drawing Sheets

METHOD FOR A PLAUSIBILITY CHECK OF THE OUTPUT SIGNAL OF A RAIL PRESSURE SENSOR

FIELD OF THE INVENTION

The present invention relates to a method for a plausibility check of the output signal of a rail pressure sensor of a direct-injecting internal combustion engine having a common rail system.

BACKGROUND INFORMATION

Requirements for modern internal combustion engines—both with regard to the statutory framework with respect to permissible emission values and increased expectations of end users with regard to driving comfort, engine smoothness, and low consumption—are continuously increasing.

To meet these requirements, very precise control of the fuel combustion is needed. In an internal combustion engine having a so-called common rail system fuel is pumped at high pressure into a common reservoir known as a rail via a high-pressure pump and stored in the rail. The fuel is directed from this rail to the injectors. The control parameters of the injectors needed for injection are predefined by an engine control unit as a function of the operating point. The pressure of the fuel in the rail at which the fuel is injected into the combustion chamber is a decisive and central variable for the combustion.

Common rail systems of this type have a rail pressure sensor which is an integral component of the common rail injection system. The values of this sensor are analyzed in the engine control unit and used for regulating the desired setpoint rail pressure and for ascertaining the required electrical control of the injection actuator required for a certain injected quantity, for example, of a piezoelectric injector or an injector having a solenoid valve. An unrecognized maladjustment/drift of this rail pressure sensor therefore results in an erroneous injected quantity and thus in poorer emissions. For this reason, the rail pressure sensor must be monitored due to the applicable regulations for on-board diagnosis (OBD).

Purely in principle, the sensor could be monitored by installing a second sensor. However, this is impracticable for cost reasons.

SUMMARY OF THE INVENTION

The method according to the present invention has the advantage over the related art in that no additional sensors are needed, but a plausibility check of the output signal of the rail pressure sensor is possible on the basis of the output signal of the rail pressure sensor.

A basic idea of the method according to the present invention is that a rail pressure value is calculated from the dynamic properties of the output signal of the rail pressure sensor, which is independent of the sensor characteristic to be checked for plausibility and does not rely upon a defined pressure value such as, for example, the atmospheric pressure. It is possible, using the method according to the present invention, to recognize a drift/maladjustment of the sensor during driving operation without any additional on-board hardware.

This is accomplished via the following steps:

- the output signal of the rail pressure sensor is detected over a predefinable period of time and recorded;
- the output signal is transformed into the frequency space;
- characteristic features are extracted from the transformed signal;

- a rail pressure value is calculated on the basis of the features and additional, predefined influencing variables;
- an average rail pressure value is simultaneously ascertained from the output signal of the rail pressure sensor;
- the average rail pressure value is compared with the calculated rail pressure value;
- in the event that the calculated rail pressure value deviates from the average rail pressure value by a predefined limiting value, an error signal is output and/or stored in an error memory.

The transformation into the frequency space is thus preferably performed via a Fourier transform.

An advantageous embodiment of the method provides for the following Fourier transforms: a fast Fourier transform (FFT) or a discrete Fourier transform (DFT), possibly also taking into account zero padding, or a short-time Fourier transform (STFT).

Frequency maximums or the integral over the frequency of the frequency spectrum are preferably used as characteristic features of the transformed signal.

According to a preferred embodiment of the method, the average rail pressure value obtained from the output signal of the rail pressure sensor is ascertained with the aid of a characteristic stored in a memory.

One or more of the following variables are preferably used as predefined influencing variables: the material properties of the fuel, the geometry of the rail pressure system, the temperature of the fuel. All these variables are fixed variables, which may be determined in advance. According to an advantageous embodiment, the output signal of the rail pressure sensor is furthermore detected over the predefinable period of time at a high sampling rate. Such a high sampling rate considerably improves the resolution of the signal and thus the subsequent fast Fourier transform.

DETAILED DESCRIPTION

Figure 1:
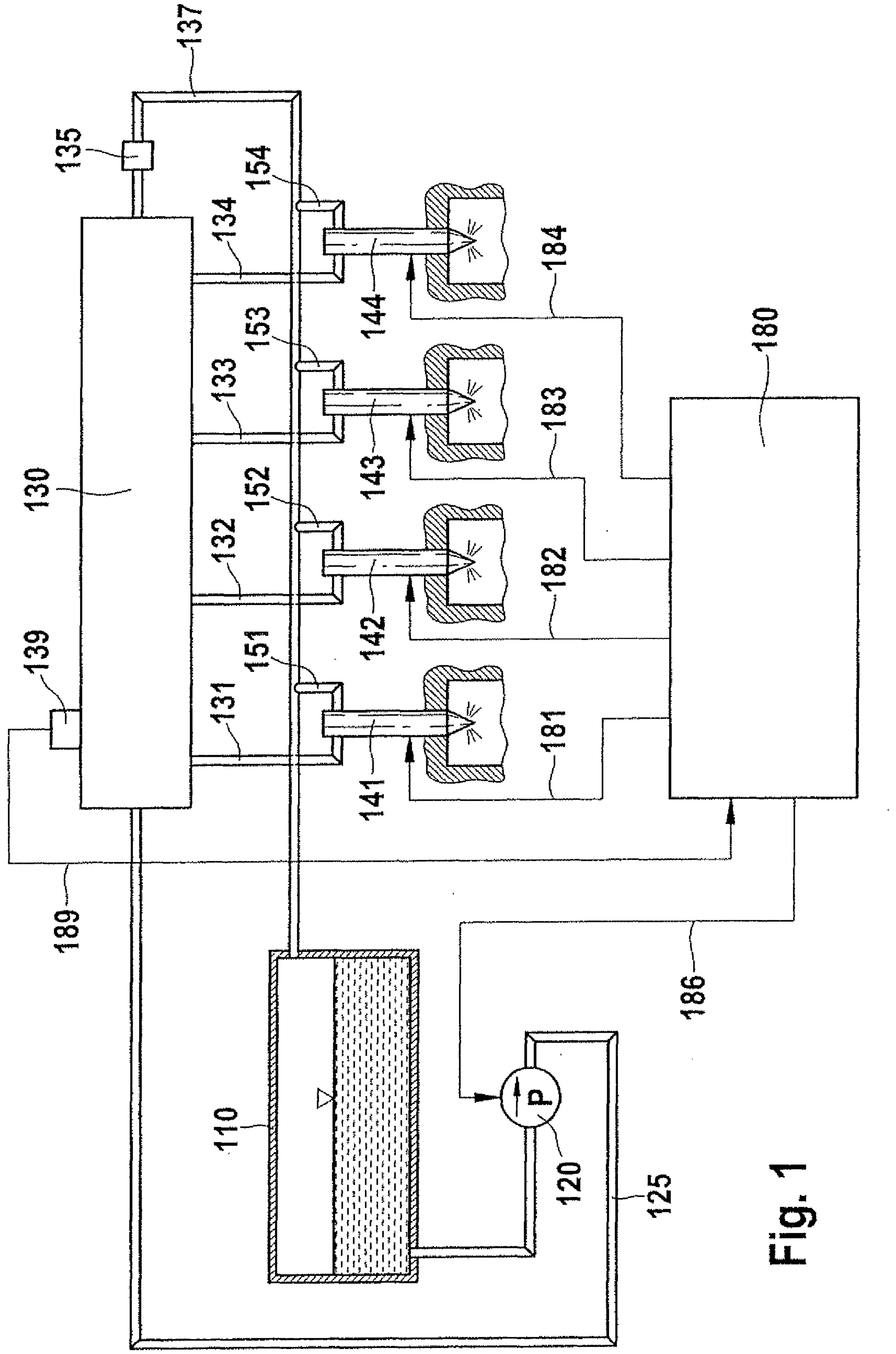
FIG. 1 schematically shows a common rail system for a direct-injecting internal combustion engine in which the method according to the present invention is used.

A common rail system of an internal combustion engine (not depicted) of a vehicle, shown in FIG. 1, has a tank 110, from which a high-pressure pump 120 pumps fuel at high pressure into a common reservoir known as rail 130 via a line 125.

Injectors 141, 142, 143, 144 which inject fuel at high pressure into the combustion chambers—in the figure four combustion chambers—of an internal combustion engine are connected to the rail via lines 131, 132, 133, 134.

The rail is connected to tank 110 via a pressure limiting valve 135 and return line 137.

In the same way, injectors 141, 142, 143, 144 have return lines 151, 152, 153, 154, which end in line 137. Injectors 141, 142, 143, 144 are controllable by a control device, a so-called engine control unit 180, via electrical control lines 181, 182, 183, 184. Similarly, high-pressure pump 120 is controllable by engine control unit 180 via an electrical control line 186.

A rail pressure sensor 139, which is situated on rail 130 and detects the rail pressure, is connected to control unit 180 via a signal line 189. The rail pressure is analyzed in control unit 180 as described below for a plausibility check of the output signal of rail pressure sensor 139.

A basic idea of the present invention is that a drift/maladjustment of rail pressure sensor 139 is detected without additional on-board hardware during driving operation. Purely in principle, rail pressure sensor 139 could be checked for plausibility at a known pressure in rail 130, which, however, is not necessary in this method. The defined pressure value required therefore is established, for example, in an internal combustion engine not operated for a longer time, i.e., in a vehicle at a standstill for a longer time. In this case, atmospheric pressure prevails in rail 130, which allows a zero point offset to be recognized.

The method described below now calculates a rail pressure value, which is independent of the sensor characteristic to be checked for plausibility and does not rely upon a defined pressure value such as, for example, the atmospheric pressure, from the dynamic properties of the output signal, i.e., of the output signal of rail pressure sensor 139. This makes it also possible to check the rail pressure for plausibility during driving operation.

Figure 2:
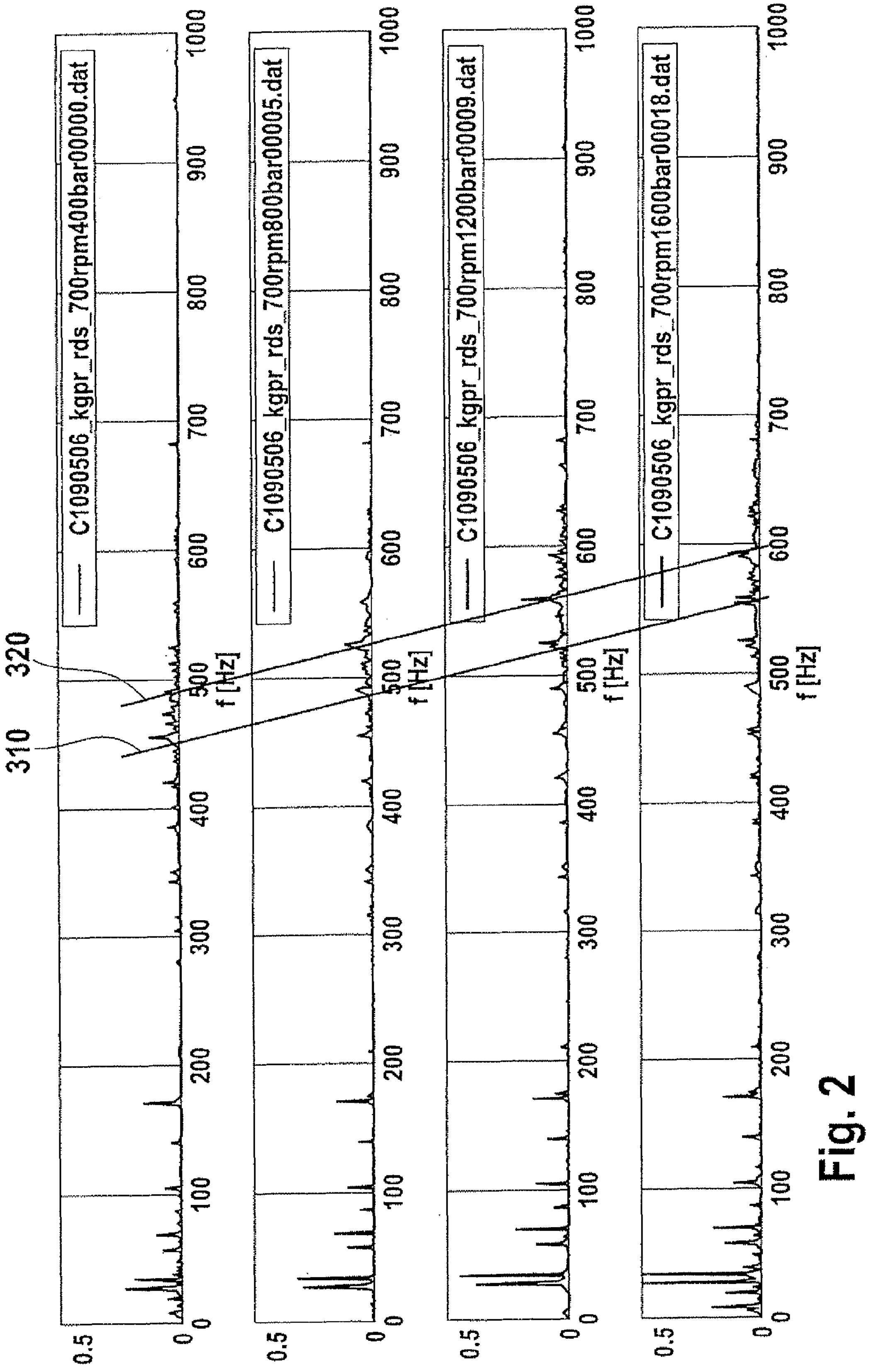
FIG. 2 shows the absolute values of the Fourier transforms plotted against the frequency at different pressures.

For this purpose, the rail pressure is recorded at a high sampling rate, and this signal is transformed into the frequency space, for example, via a fast Fourier transform (FFT) or a discrete Fourier transform (DFT), possibly also taking into account zero padding, or a short-time Fourier transform (STFT). FIG. 2 shows the absolute values of the Fourier transforms plotted against the frequency at different pressures. As is apparent from FIG. 2, at characteristic frequencies f of the pressure waves, maximums 310, 320 appear in the power density spectrum, which, when the other influencing variables such as the material properties of the fuel, the geometry of the rail pressure system, and the temperature of the fuel are known, make it possible to back-calculate to the actually existing pressure. If the characteristic of rail pressure sensor 139 now shifts, the position of the maximums in the spectrum also shifts at identically set and predefined rail pressures measured with the aid of sensor 139 because the actual rail pressure is different from the one measured by rail pressure sensor 139; measured here means the determination of the rail pressure from a characteristic on the basis of the rail pressure signal. The shift may be detected. The technical signal processing options to do so are provided by special DSP instruction sets in the TriCore processor which is essentially known and used in today's control units. A fast Fourier transform FFT and different filter functions, for example, may be implemented on the assembler level with high efficiency, i.e., implemented as a computer program; the computer program may be implemented on the computer, which is embodied by the control unit of the internal combustion engine, with the aid of a computer program product having a program code which is stored on a machine-readable medium, for example.

The required high sampling rates may be achieved on the control unit side by using a fast analog-digital converter in conjunction with today's customary rail pressure sensors 139. In this way, the method, which is described below with reference to FIG. 3, may be implemented in today's customary control units and is possibly also retrofittable by loading the appropriate program.

Figure 3:
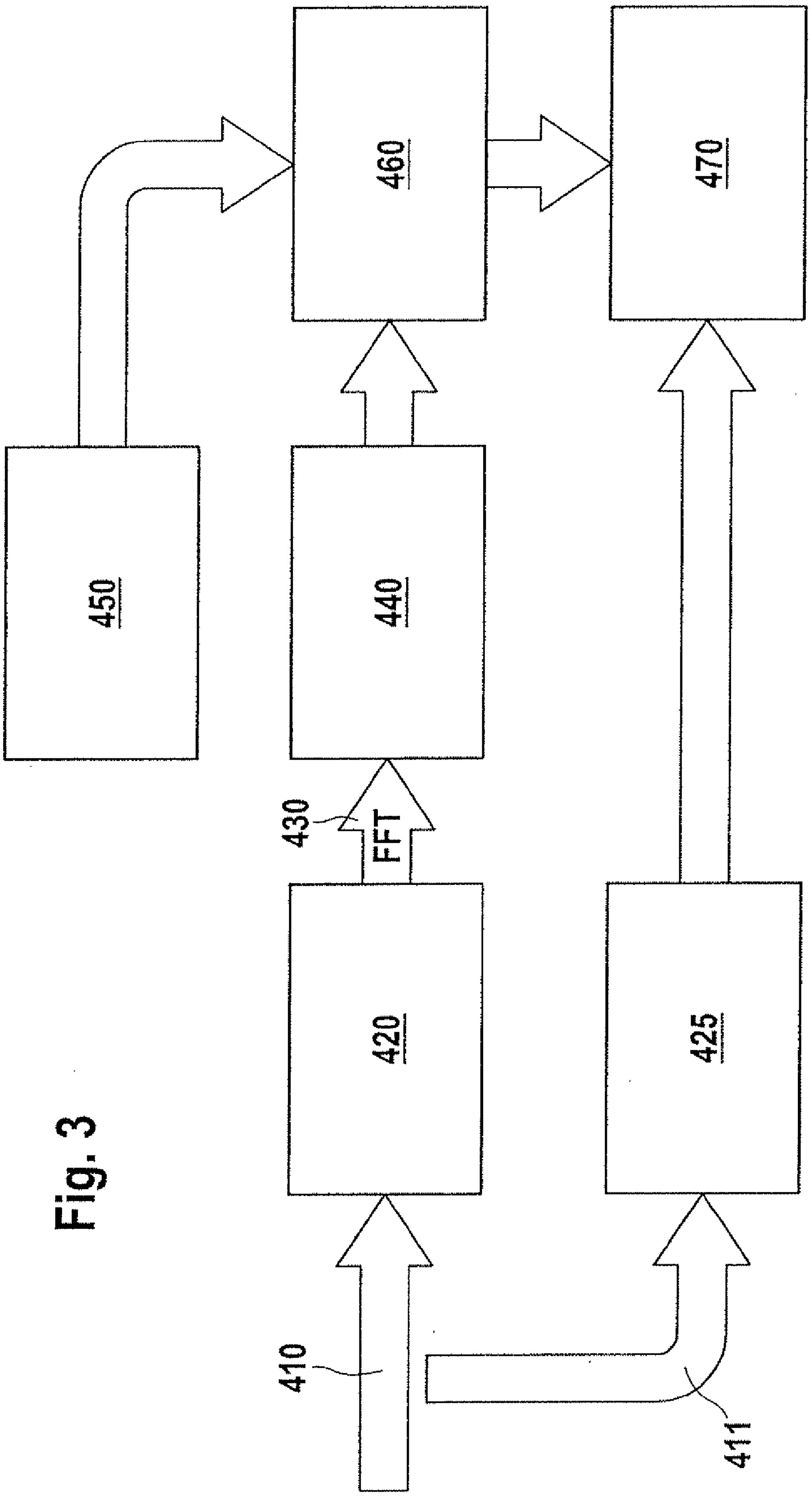
FIG. 3 schematically shows a flow chart of the method according to the present invention or circuit units for carrying out the method.

The method is described in detail below with reference to the diagram depicted in FIG. 3. The individual method steps described below are, as mentioned previously, implementable via an appropriate computer program. It is understood, however, that the present invention is not limited thereto, but the individual method steps may also be implemented in the form of circuit units. In this case, FIG. 3 is to be understood as a block diagram.

An output signal of rail pressure sensor 139, represented by an arrow 410, is supplied to a (circuit) unit 420, where the rail pressure is detected at a high sampling rate. Simultaneously, the output signal, as indicated by an arrow 411, is supplied to a (circuit) unit 425, in which the average rail pressure is ascertained on the basis of a characteristic stored in a memory (not depicted). The rail pressure detected with the aid of a high sampling rate is transformed, for example, via a fast Fourier transform (FFT) 430, into the frequency space. In the step or in (circuit) unit 440, an extraction of characteristic frequencies of the absolute value of the Fourier transforms is determined or by forming the integral of the Fourier spectrum over the frequency. On the basis of these frequencies and predefined influencing variables 450 a back-calculation is performed to the "true," i.e., actually existing rail pressure in a step or in a (circuit) unit 460. The calculated rail pressure value is compared with the average rail pressure value which is ascertained on the basis of the characteristic in unit 425, in step 470 or in a (circuit) unit. In the event that the calculated rail pressure value deviates from the average rail pressure value by a predefined limiting value, an error signal, i.e., an error message, which may be visual or acoustic, for example, is output and/or stored in an error memory.

What is claimed is:

1. A method for a plausibility check of an output signal of a rail pressure sensor of a direct-injecting internal combustion engine having a common rail system, comprising:

detecting the output signal of the rail pressure sensor over a predefinable period of time;

recording the output signal;

transforming the output signal into the frequency space;

extracting characteristic features from the transformed signal;

calculating a rail pressure value on the basis of the features and additional, predefined influencing variables;

simultaneously ascertaining an average rail pressure value from the output signal of the rail pressure sensor;

comparing the average rail pressure value with the calculated rail pressure value; and in the event that the calculated rail pressure value deviates from the average rail pressure value by a predefined limiting value, at least one of (a) outputting an error signal and (b) storing an error signal in an error memory.

2. The method according to claim 1, wherein the transformation into the frequency space is performed via a Fourier transform.

3. The method according to claim 2, wherein a fast Fourier transform, or a discrete Fourier transform, or a discrete Fourier transform taking into account zero padding, or a short-time Fourier transform is used as the Fourier transform.

4. The method according to claim 1, wherein frequency maximums or integrals of the frequency spectrum over the frequency are used as features.

5. The method according to claim 1, wherein the average rail pressure value is ascertained on the basis of a stored characteristic.

6. The method according to claim 1, wherein one or more of the following variables are used as predefined influencing variables: material properties of a fuel, a geometry of the rail pressure system, a temperature of the fuel.

7. The method according to claim 1, wherein the output signal of the rail pressure sensor is detected over the predefinable period of time at a high sampling rate.

8. A computer-readable medium containing a computer program which when executed by a processor performs the following method for a plausibility check of an output signal of a rail pressure sensor of a direct-injecting internal combustion engine having a common rail system:

detecting the output signal of the rail pressure sensor over a predefinable period of time;

recording the output signal;

transforming the output signal into the frequency space;

extracting characteristic features from the transformed signal;

calculating a rail pressure value on the basis of the features and additional, predefined influencing variables;

simultaneously ascertaining an average rail pressure value from the output signal of the rail pressure sensor;

comparing the average rail pressure value with the calculated rail pressure value; and in the event that the calculated rail pressure value deviates from the average rail pressure value by a predefined limiting value, at least one of (a) outputting an error signal and (b) storing an error signal in an error memory.

* * * * *